United States Patent
Bullman et al.

(10) Patent No.: US 7,039,690 B2
(45) Date of Patent: May 2, 2006

(54) SYSTEM AND METHOD FOR ACCESSING REGISTERS OF PHY DEVICE IN NETWORK

(75) Inventors: William R. Bullman, Bethlehem, PA (US); Ryan S. Holmqvist, Bethlehem, PA (US); Steven E. Strauss, Orefield, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 872 days.

(21) Appl. No.: 09/920,574

(22) Filed: Aug. 1, 2001

(65) Prior Publication Data

US 2003/0028658 A1 Feb. 6, 2003

(51) Int. Cl.
*G06F 15/16* (2006.01)

(52) U.S. Cl. .................. 709/220; 709/228; 709/250
(58) Field of Classification Search ............. 709/230, 709/232, 236, 220, 228, 250, 233
See application file for complete search history.

(56) References Cited

U.S. PATENT DOCUMENTS

| | | | |
|---|---|---|---|
| 6,011,799 A * | 1/2000 | Kerstein et al. ............ 370/422 |
| 6,065,073 A * | 5/2000 | Booth ......................... 710/46 |
| 6,349,331 B1 * | 2/2002 | Andra et al. ................ 709/220 |
| 6,513,085 B1 * | 1/2003 | Gugel et al. ................ 710/305 |
| 6,651,107 B1 * | 11/2003 | Conley et al. .............. 709/250 |
| 6,768,720 B1 * | 7/2004 | Kamstra et al. ............ 370/245 |
| 6,813,729 B1 * | 11/2004 | Tsang et al. ................ 714/43 |
| 2001/0034799 A1 * | 10/2001 | Ito et al. ..................... 709/250 |
| 2002/0073261 A1 * | 6/2002 | Kosaraju ..................... 710/240 |
| 2002/0112106 A1 * | 8/2002 | Henehan et al. ........... 710/113 |
| 2002/0156943 A1 * | 10/2002 | Ishimura et al. .............. 710/5 |
| 2003/0005031 A1 * | 1/2003 | Tsunakawa ................. 709/201 |

* cited by examiner

*Primary Examiner*—Zarni Maung
*Assistant Examiner*—Van Nguyen

(57) ABSTRACT

A system and method for accessing registers of a PHY device in a network including an extended protocol software layer between the protocol and application layers, on the one hand, and the MAC driver, on the other hand. The extended protocol layer generates the PHY device register read and write commands and embeds them within standardized Ethernet data packets. The extended PHY device is adapted to distinguish these register read and write command packets from normal data packets and intercept and parse them to retrieve the commands. Likewise, the extended PHY device embeds the read and write acknowledgments in standardized Ethernet data packets that the extended protocol layer, in turn, can distinguish from normal Ethernet data packets and intercept and parse them to retrieve the acknowledgments.

23 Claims, 4 Drawing Sheets

SYSTEM AND METHOD FOR ACCESSING REGISTERS OF PHY DEVICE IN NETWORK

BACKGROUND OF THE INVENTION

1. Field of the Invention

The present invention relates to computer network systems and, more particularly, to a system and method for accessing registers of a Physical (PHY) device in a network.

2. Discussion of Related Art

A conventional PHY device in a conventional network such as an Ethernet network requires a set of registers therein for storing control data such as status data indicating the status of the PHY device. These registers are defined by and operate according to predetermined IEEE standards and specification 802.3 for Ethernet. A conventional register access operation of a conventional PHY device in the Ethernet will be described below referring to FIG. 1.

FIG. 1 is a block diagram of a conventional system 5 for accessing the registers of a PHY device for Ethernet. As shown in FIG. 1, the system 5 includes protocol and application layers 10, a Media Access Controller (MAC) driver 30, a MAC device 40, a Media Independent Interface (MII) 43, a PHY device 45 including registers 44, and a network medium 60 such as cables, all operatively coupled.

The MII 43 is a hardware interface for controlling communication between the MAC device 40 and other components of the network such as the PHY device 44. The MII 43 operates according to the well-defined IEEE standard 802.3. Particularly, the MII 43 includes, among other things, a Management Data Input/Output (MDIO) 42 used to communicate register read/write requests to the PHY device 45. The MDIO 42 basically is an input/output bus for transferring signals of some value between the MAC device 40 and the PHY device 45.

During a normal, i.e., payload data packet processing operation, data packets are transmitted from the protocol and application layers 10 to the MAC driver 30. The MAC driver 30, which is computer software for driving the MAC device 40, forwards the data packets to the MAC device 40 which in turn forwards the data packets to the PHY device 45 via the MII 43. The PHY device 45 converts the data packets into appropriate signals, for example, electrical or optical signals, and sends out the signals on the medium 60. This normal data packet process occurs according to predetermined standards and protocols.

When a particular component or application desires to access the register(s) 44 of the PHY device 45 (e.g., to check the status of the PHY device 45), the MAC driver 30 generates register read/write request signals for reading from or writing to the register(s) 44 of the PHY device 45, and loads these request signals to a designated register of the MAC device 40. At the same time, the MAC driver 30 interrupts the normal data packet processing operation so that the transfer of data packets is stopped temporarily. Then the register of the MAC device 40 loads the register read/write request signals onto the MDIO bus 42 of the MII 43. The PHY device 45 then receives the register read/write request signals that are output from the MDIO 42, and processes these request signals by reading from or writing to the designated register(s) 44 of the PHY device 45.

Once the accessing of the registers 44 of the PHY device 45 is completed, the MAC driver 30 controls the MAC device 40 to resume its normal data packet processing operation. The entire register access operation occurs according to predetermined standards and protocols.

Problems, however, arise in such a conventional system for accessing the registers of a PHY device. As networking technologies develop, modifications to the existing network standards may be desired, or new network standards are introduced. For example, additional registers for controlling additional parameters and new services, etc., may need to be added in the PHY device. However, since the MDIO of the MII is configured to operate only according to the fixed IEEE standards which do not necessarily accommodate proprietary modifications or new standards, the system 5 is not capable of controlling or accessing the new registers of the PHY device. The only way to implement the accessing of the new registers of the PHY device is to make significant modifications to the MAC device and the MAC driver. But, such modifications are expensive and rather complicated, and will require significant alterations to the existing, well-defined MAC hardware and software, which can affect the overall operation of the entire network system. Further, each time new industry network standards are introduced, the MAC hardware and software will need to change, which would be extremely expensive and likely to introduce computer "bugs" to the system.

Furthermore, the register access operation of the system 5 is extremely time consuming because the loading of the register read/write request signals to the MDIO is a low speed operation. As a result, as discussed above, the MAC driver can suspend the normal data packet processing operation of the system 5 for longer than would be desirable. This can create a significant time delay problem in the entire operation of the network and can degrade system data throughput.

Moreover, the conventional register access operation often results in a loss of critical data packets and data errors in the network because of the interruptions and resumptions of the normal data packet processing operation. Thus, the conventional register access operation is not a suitable technique by which modifications to the existing standards or introduction/addition of new standards can be implemented easily, cost-effectively and repeatedly in ever-evolving network systems.

It obviously is an advantage to reuse existing, well-defined network components such as MAC devices and MAC drivers from a technical reuse and cost perspective. Therefore, a need exists for a system and method for accessing registers of a PHY device in a network which overcomes problems encountered in conventional methods and systems without requiring significant modifications to the existing MAC devices and MAC drivers.

SUMMARY OF THE INVENTION

The present invention is directed to a system and method for accessing registers of a PHY device in a network that allows a PHY device to be replaced with a modified (or extended) PHY device having additional and/or different control registers without the need to replace the MAC driver and/or MAC device. Particularly, an extended protocol software layer is added between the protocol and application layers, on the one hand, and the MAC driver, on the other hand. The extended protocol layer generates the PHY device register read and write commands and embeds them, including the data in the case of write commands, within standardized Ethernet data packets. The extended PHY device is adapted to distinguish these register read and write command packets from normal data packets and intercept and parse them to retrieve the commands. Likewise, the extended PHY device embeds the read and write acknowledgments in standardized Ethernet data packets. The extended protocol layer, in turn, can distinguish the acknowledgment packets from normal Ethernet data packets and intercept and parse them to retrieve the acknowledgments.

The present invention allows existing MAC devices and the MAC drivers currently available in the market to be used in networks with subsequently modified protocols without any modification to their configurations. Accordingly, by modifying only the conventional PHY device and providing an extended protocol layer, the present invention allows the registers of the PHY device to be accessed without the need to modify the conventional MAC device hardware and/or MAC driver software. This can be a significant advantage since it may be much less complicated and less costly to introduce the extended protocol layer than to modify existing MAC hardware and software. Furthermore, the present invention easily accommodates any new packet standards that may be introduced in the future by configuring the PHY device and the extended protocol layer to generate and process register access command/acknowledgment data packets. Moreover, since the register access requests are in the form of standardized data packets, the processing time for implementing the register access operations can be reduced greatly, thereby facilitating accurate and frequent updating and accessing of the registers of the PHY device.

DETAILED DESCRIPTION OF THE PREFERRED EMBODIMENTS

Figure 1:
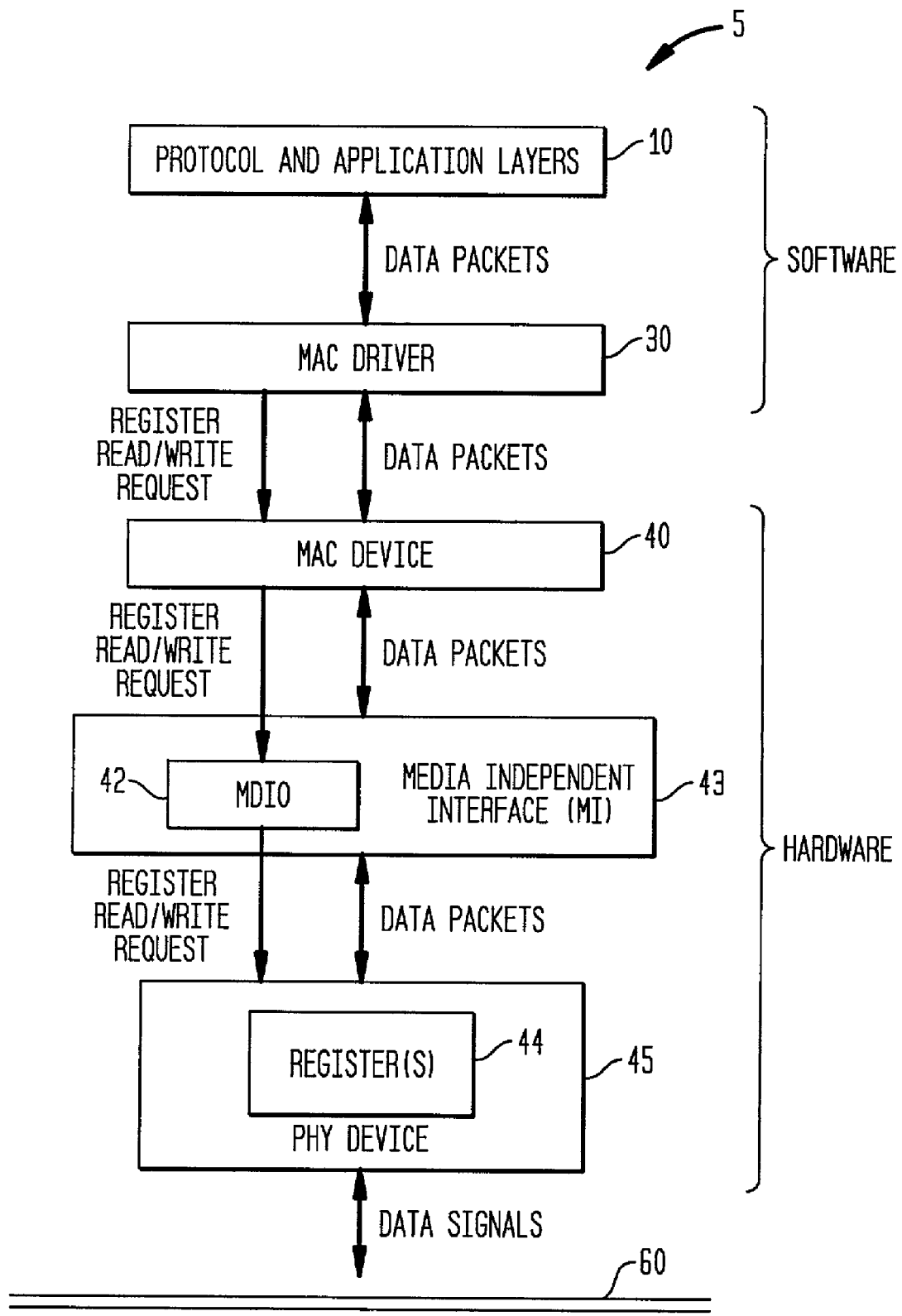
FIG. 1 is a block diagram of a conventional system for accessing registers of a PHY device in a conventional network.

In the drawings, the same reference numerals are used to indicate the same elements.

Figure 2:
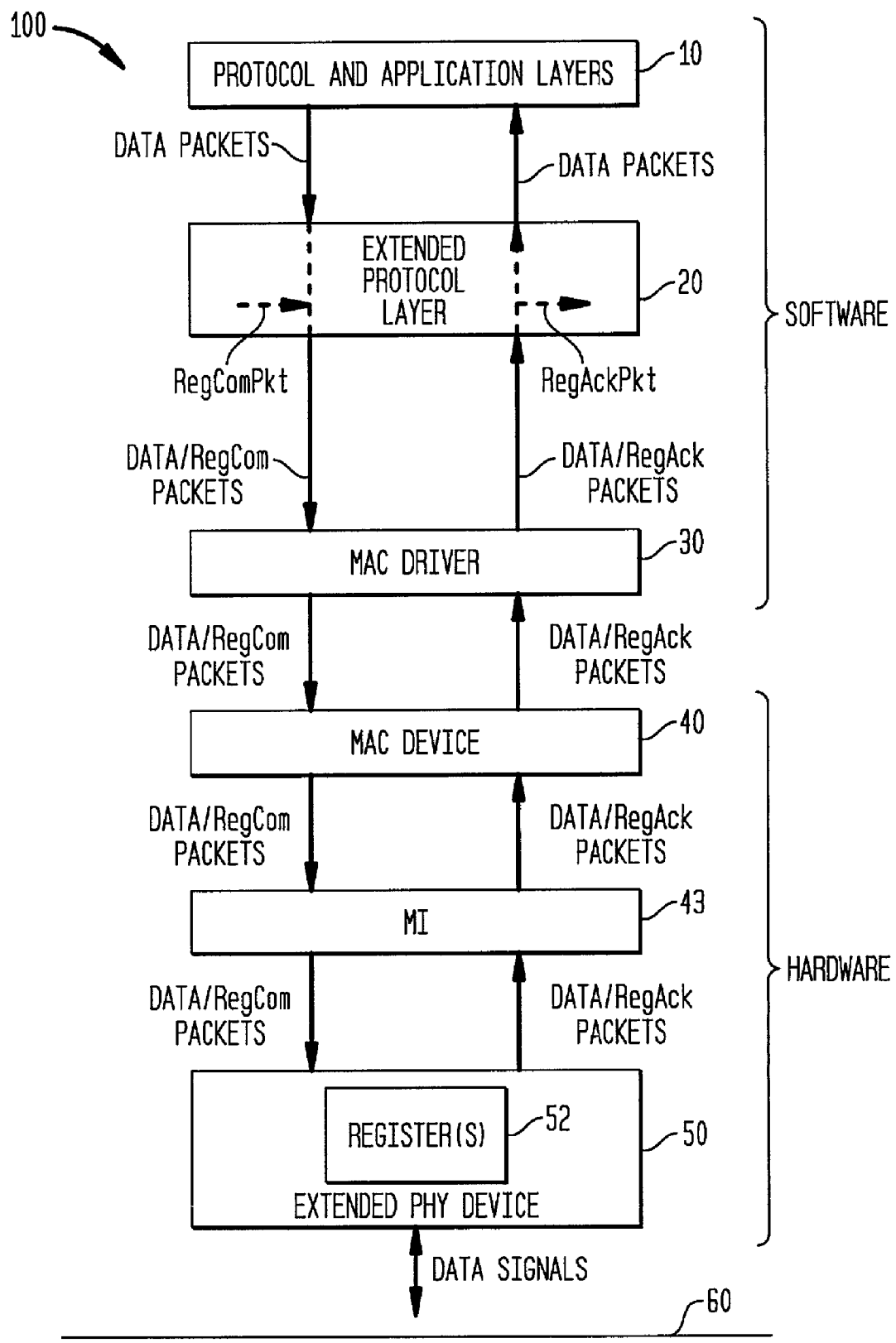
FIG. 2 is a block diagram of a system for accessing registers of a PHY device in a network according to one embodiment of the present invention.

FIG. 2 is a block diagram of a system 100 for accessing registers of a PHY device in a network according to one embodiment of the present invention. The system 100 can be implemented in a computer of a packet-based network system. As shown in FIG. 2, the system 100 includes protocol and application layers 10, an extended protocol layer 20, a MAC driver 30, a MAC device 40, a Media Independent Interface (MII) 43, an extended PHY device 50, and a network medium 60, all operatively coupled. The protocol and application layers 10, the MAC driver 30, the MAC device 40, and the MII 43 are conventional components that operate in known manners and perform a normal data packet processing operation for processing data packets in a known manner.

The extended PHY device 50 is a modified version of a conventional PHY device, and includes registers 52. The registers 52 are any set of registers that are included in the extended PHY device 50 to carry out any desired operations and services in the network. These registers 52 may include conventional status registers such as the registers 44 shown in FIG. 1 and/or any additional registers which are required due to modifications to standards, introduction of new standards, or for some other reason.

The extended protocol layer 20 is an additional protocol layer disposed between the protocol and application layers 10 and the MAC driver 30. The extended protocol layer 20 is computer software for generating register commands as well as receiving and processing register access acknowledgments from the extended PHY device 50. The extended PHY device 50 is capable of receiving and processing the register access commands from the extended protocol layer 20 as well as generating register access acknowledgments.

According to the present invention, read and write commends for the PHY registers as well as the responses (acknowledgments) thereto are embedded within standardized Ethernet data packets. These PHY register read and write command packets are generated by the extended protocol layer and are intercepted and parsed by the extended PHY device 50 before they reach the transmission medium. The acknowledgments of these commands are generated and converted to Ethernet packets by the extended PHY device and are intercepted and parsed by the extended protocol layer 20 before they reach standard protocol and application layers. The register access commands are unique instructions to read the contents of any designated register(s) 52 of the extended PHY device 50, or to write contents into any designated register(s) 52 of the extended PHY device 50. The register access commands are represented as data packets "RegComPkts". The RegComPkts are divided into two categories of data packets—a register read packet "ReadPkt" and a register write packet "WritePkt". The register access acknowledgments are represented as data packets "RegAckPkts" and indicate acknowledgment of execution of register read/write commands. The RegAckPkts are divided into two categories of data packets—a register read acknowledgment packet "ReadAckPkt" and a register write acknowledgment packet "WriteAckPkt". The RegComPkts and RegAckPkts are collectively referred to herein as "register access packets", and are in a standardized data packet format. That is, the register access packets have the standardized data packet structure that is well understood by conventional components of the network such as the MAC driver and the MAC device. As a result, the MAC driver and the MAC device treat these register access packets of the present invention as normal data packets processed during a normal data packet processing operation of the network.

One skilled in the art would readily appreciate that the protocol and application layers 10, the extended protocol layer 20, and the MAC driver 30 are computer software, whereas the MAC device 40, the MII 43, the extended PHY device 50 and the medium 60 are mainly hardware. The network medium 60 is any medium that carries signals (e.g., electrical, optical, radio, etc.) to other devices in the network for enabling communication between these devices, and can be, e.g., coaxial cable, optical fiber, twisted wire, etc.

Figure 3:
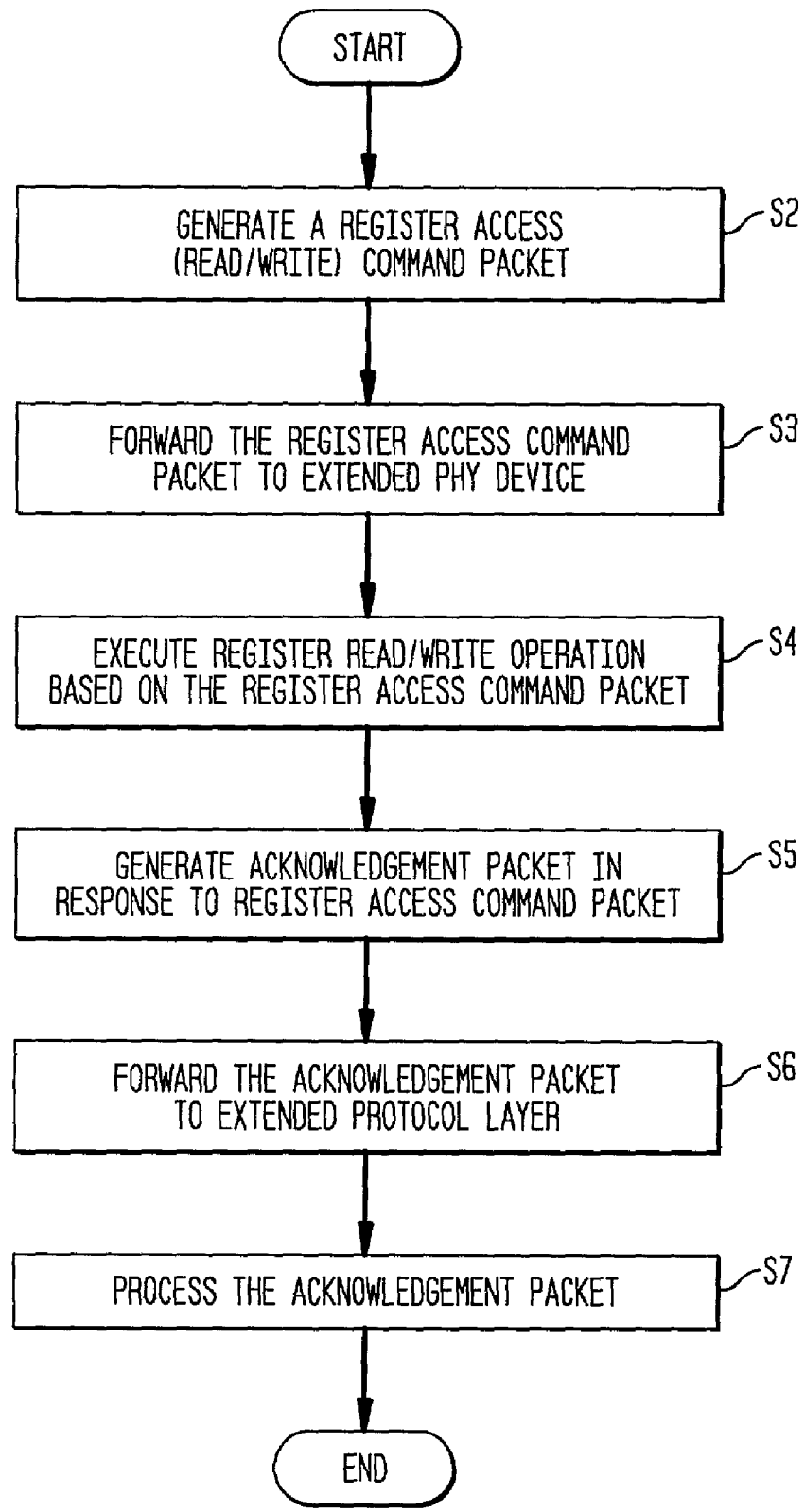
FIG. 3 is a flowchart illustrating the processing steps of a method for accessing registers of a PHY device in a network according to one embodiment of the present invention.

FIG. 3 is a flowchart illustrating the processing steps of a method for accessing registers of a PHY device in a communications network according to one embodiment of the present invention. These processing steps can be implemented in the system 100 shown in FIG. 2. Generally, when a register access operation is not performed, the network system such as the system 100 performs a normal data packet processing operation or some other operation according to known techniques. Then, when a register access operation is desired, the current operation is completed and the register access operation begins.

As shown in FIG. 3, to start the register access operation of the present invention, a register access command packet (RegComPkt) is generated by the extended protocol layer 20 in Step S2. This can be triggered based on certain criteria or in response to certain instructions from the protocol and application layers 10. The RegComPkt can be a register read packet (ReadPkt) or a register write packet (WritePkt). If the RegComPkt is a WritePkt, the WritePkt would also carry the content or data to be written to designated register(s) 52 of the extended PHY device 50. The generated RegComPkt is output to the MAC driver 30.

In Step S3, the generated RegComPkt is received by the MAC driver 30 which forwards the RegComPkt to the extended PHY device 50 through the MAC device 40 and the MII 43. Here, since the RegComPkt is in a normal data packet format as discussed above, the MAC driver 30, the MAC device 40 and the MII 43 treat the RegComPkt as a normal data packet and processes it according to existing normal data packet processing techniques. That is, the MAC driver 30 forwards the RegComPkt to the MAC device 40 which, in turn, forwards it to the MII 43 which, in turn, forwards it to the extended PHY device 50.

In Step S4, the extended PHY device 50 receives the RegComPkt and determines that this packet is a register access command packet. This can be accomplished, for instance by using a new EtherType field value, that value signifying that the packet is a register access packet, as opposed to a data packet. Other options are described more fully below in connection with FIG. 4. Once the extended PHY device 50 recognizes the RegComPkt as a register access command packet, it processes it by executing the requested register access command operation. If the RegComPkt is a register read packet, ReadPkt, then the extended PHY device 50 reads the contents of the designated register(s) 52 of the extended PHY device 50. If the RegComPkt is a register write packet, WritePkt, then the extended PHY device 50 writes new content or data into the designated register(s) 52 of the extended PHY device 50 using the new content/data contained in the register write packet WritePkt.

In Step S5, once the register reading or writing operation is completed, a register access acknowledgment packet (RegAckPkt) is generated by the extended PHY device 50 in response to the execution of the register access command packet, RegComPkt.

For instance, if a register read operation is completed, the extended PHY device 50 generates a register read acknowledgment packet "ReadAckPkt" and sends it to the MII 43. If a register write operation is completed, the extended PHY device 50 generates a register write acknowledgment packet "WriteAckPkt" and sends it to the MII 43.

In Step S6, the MII 43 receives the register access acknowledgment packet RegAckPkt and forwards it to the extended protocol layer 20 through the MAC device 40 and the MAC driver 30. Since the register access acknowledgment packet RegAckPkt is in a standardized data packet format as discussed above, the MII 43, the MAC device 40, and the MAC driver 30 treat the RegAckPkt as a normal data packet and processes it according to existing normal data packet processing techniques. That is, the MII 43 forwards the RegAckPkt to the MAC device 40 which in turn forwards it to the MAC driver 30 which in turn forwards it to the extended protocol layer 20.

In Step S7, the extended protocol layer 20 receives the register access acknowledgment packet RegAckPkt and processes it by updating its records. This completes the register access operation for a PHY device in a network according to the present invention.

Figure 4:
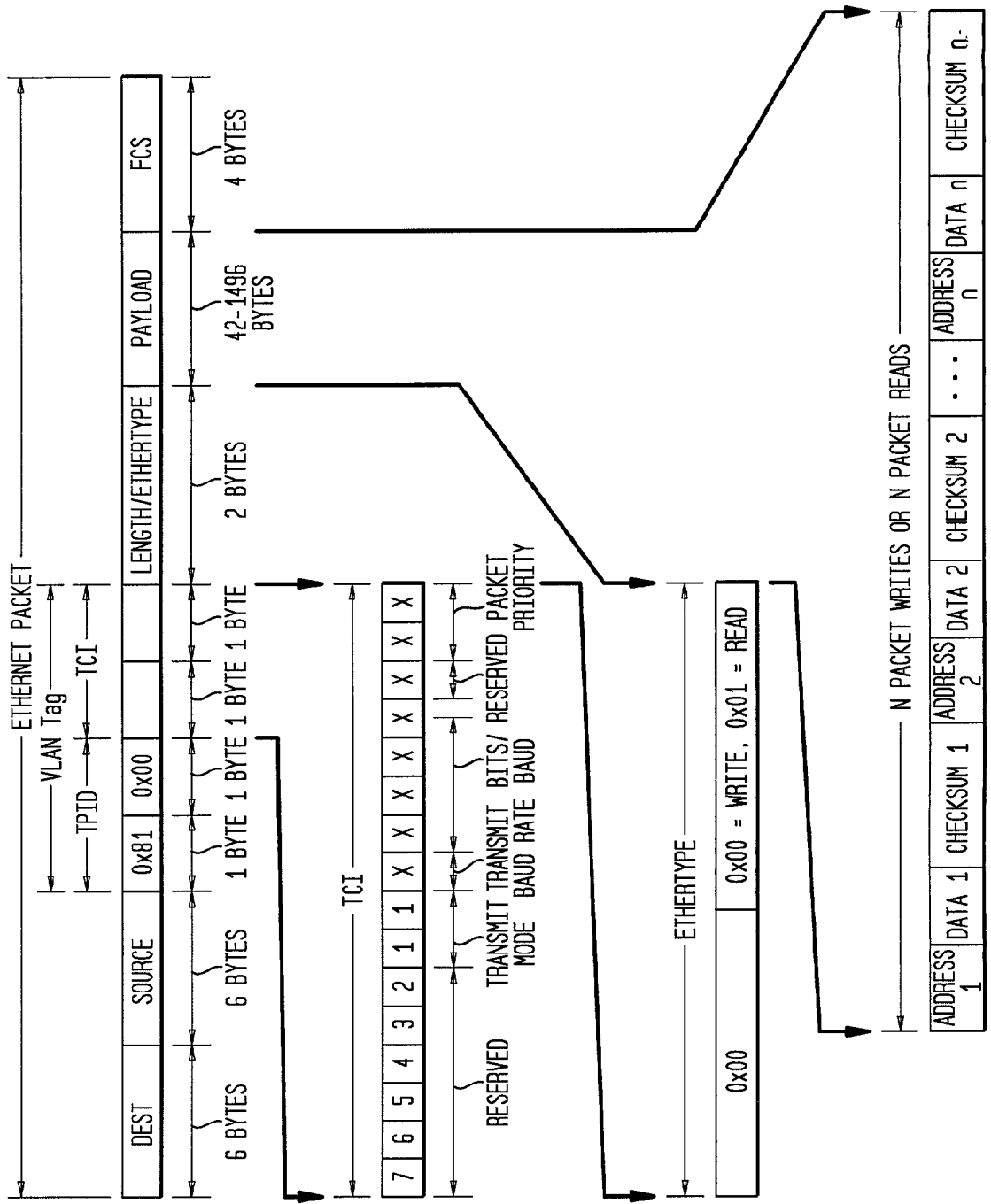
FIG. 4 is a diagram of a standardized Ethernet packet adapted to use as a register access packet in accordance with the present invention.

FIG. 4 is a diagram of a standardized Ethernet packet with a VLAN (virtual local area network) header (802.1 Q) adapted for use as a register access packet in accordance with the present invention. As shown, a standardized VLAN Ethernet packet comprises anywhere from 68 to 1522 bytes. Bytes 0–5 are used for the destination address. Bytes 6–11 are used for the source address. Bytes 12–15 are an 802.1 Q VLAN tag. More specifically, bytes 12–13 are used for tag protocol identification (TPID) and bytes 14–15 are used for tag control information (TCI). Bytes 16–17 are used for reporting the length of the packet and the EtherType. The next 42 to 1496 bytes (depending on the length of the packet) are commonly called the payload and are used for the actual data being transmitted. The last four bytes of the packet are used for frame check sequence (FCS).

Since the register access packets will use the underlying packet format, the register access packets must be constructed so that they will be transparent to the various components on the network other than the extended PHY device and the extended protocol layer in connection with which they are intended to operate. Specifically, all network components through which the register access packets might pass must treat the packets as they would treat any other Ethernet data packet. Further, the register access packets must be constructed so that a normal data packet cannot be mistaken by the extended protocol layer or the extended PHY device for a register access packet. As previously mentioned, one way of doing this is to define a new EtherType field value, that value signifying that the packet is a register access packet.

However, FIG. 4 illustrates a different scheme in which the packet is identified as a register access packet by the TPID and TCI bytes (i.e., the VLAN tag). The two TPID bytes identify a particular vendor, and thus a particular tag protocol. Further, in accordance with the illustrated embodiment, the two most significant bits of the first byte of the TCI (i.e., the two MSBs of byte number 15) are used to identify the packet as a register access packet. For instance, a value of 11 (binary) in these two bit positions indicates that this packet is a register access packet. The remaining TCI bit values are not relevant to the present invention and not described in further detail herein, and, in any event, are standard Ethernet bits. The EtherType byte in the packet, i.e., byte 17, indicates whether the register access packet is a register read type packet (i.e., is one of a ReadPkt or a ReadAckPkt) or a register write type packet (i.e., is one of a WritePkt or a WriteAckPkt). As illustrated in the figure, 00H indicates a write, while 01H indicates a read.

The payload portion of the packet is used to transmit the address(es) of the register(s) being written to or read from, the data being written or read and a checksum(s) of the data (for error detection purposes). Any given register command packet, RegComPkt, can be used to read or write to any number of registers. However, in accordance with at least this particular embodiment of the invention, all of the register access commands in a given packet must be of the same type (i.e., all reads or all writes).

The payload bytes of the packet are used to transmit the register address(es), the data written to or read from those registers and checksum(s) of the data, as illustrated. The exact nature of the payload contents will depend on which of the four types of register access packets it is. In a register write command packet, i.e., a WritePkt, the payload is populated with address(es), data, and checksum(s).

In response, the extended PHY device creates a register write acknowledgment packet, i.e., a WriteAckPkt, by reading back out the data just written to the register(s), calculating a checksum(s) value for that data and inserting that data and checksum(s) along with the address(es) of the corresponding registers in the payload portion of an Ethernet packet. The other bytes of the packet are populated with the same values as is for the WritePkt as described above. Accordingly, the WriteAckPkt should be identical to the WritePkt to which it is responding, thus indicating that the data was received without error. If they do not match, then there was an error in the transmission or the PHY did not complete the command.

Turning to ReadPkts, these packets have the same construction as WritePkts, except of course, the data and checksum bytes are not populated. Likewise, the ReadAckPkts generated by the PHY device in response to the ReadPkts have essentially the same construction as WriteAckPkts. That is, the extended PHY device reads out the requested data from the selected register(s), calculates a checksum(s), adds the corresponding register address(es) and returns them to the extended protocol layer in an Ethernet packet. This packet should be identical to the ReadPkt to which is it responding, except that the data and checksums are populated.

With respect to the remaining fields in a standardized Ethernet packet, the six destination address bytes are populated with the address of the local MAC device so that upper layers will pass the register access packets up. The six source address bytes are not used and the FCS bytes are used as a checksum across the entire packet in accordance with standard 802.3 protocol.

It can be seen from the description above that, for all four types of register access packets, the destination bytes, source bytes, TPID bytes, TCI bytes and FCS bytes are the same. Only the payloads may differ.

The register access packets (RegComPkts and RegAckPkts) are distributed only locally between the extended protocol layer 20 and the extended PHY device 50, and are not communicated beyond these elements. As a result, the register access packets are neither transmitted over the medium 60 and nor communicated to the protocol and application layer 10.

Any additions or changes to the register of the extended PHY device and to the network protocols and standards can be easily implemented by merely modifying the extended protocol layer 20 and the extended PHY device 50. This is a significant advantage over conventional systems because the existing MAC device hardware and/or MAC driver software, currently available in the market, can be used without any modification to access the PHY registers.

The invention enables the interleaving of control (register access) packets and regular data packets such that the system can be dynamically altered on the fly while still fully supporting data objectives. Register access packets can be interleaved with regular data packets thus enabling, for instance, changing of the modulation scheme on the medium 60 from one regular data packet to the next.

The present invention is applicable to any communications system or network requiring access of registers of a PHY device. For example, a conventional "in-Home" Phoneline Networking (HPN) system adds additional encoding data to a standard Ethernet data packet to bring robustness to the system and to overcome data impairments introduced in homes. The present invention can be used to access the registers of a PHY device in the HPN system using an existing MAC device and MAC driver as discussed above, without having to design a new MAC device and MAC driver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A system for accessing at least one designated register of a PHY (physical layer) device in a communications network, the system comprising:
   a protocol and applications layer;
   a MAC (Media Access Control) driver;
   an extended protocol layer, disposed between the protocol and applications layer and the MAC driver, for generating an access command packet, the access command packet being encapsulated in at least one standardized Ethernet data packet and containing an access command to access the at least one designated register of the PHY device;
   and the PHY device, including the at least one designated register, for receiving the access command packet and executing the access command of the access command packet.

2. The system of claim 1, wherein the access command of the access command packet is a register read command for instructing the PHY device to read content stored in the at least one designated register of the PHY device, or is a register write command for instructing the PHY device to write certain data into the at least one designated register of the PHY device.

3. The system of claim 2, wherein, when the access command of the access command packet is a register write command, the access command packet contains therein the certain data to be written into the at least one designated register of the PHY device.

4. The system of claim 1, wherein the PHY device generates an access acknowledgment packet upon execution of the access command, the access acknowledgment packet acknowledging execution of the access command.

5. The system of claim 4, wherein the access acknowledgment packet is a register read acknowledgment packet for acknowledging execution of a read operation on the at least one designated register, or is a register write acknowledgment packet for acknowledging execution of a write operation on the at least one designated register.

6. The system of claim 5, wherein, when the access acknowledgment packet is a register read packet, the register read packet contains contents read from the at least one designated register of the PHY device.

7. The system of claim 4, wherein at least one of the access command packet and the access acknowledgment packet is in a standardized data packet format.

8. The system of claim 4, further comprising:
   a MAC (media access controller) driver for communicating with the extended protocol layer;
   a MAC device being controlled by the MAC driver;
   and an interface for interfacing communication between the MAC device and the PHY device.

9. The system of claim 8, wherein each of the MAC driver, the MAC device and the interface processes the access command packet and the access acknowledgment packet as standardized data packets.

10. The system of claim 9, further comprising:
    protocol and application layers for communicating with the extended protocol layer.

11. An extended PHY (physical layer) device for use in a network system, the extended PHY device including registers for storing data, the extended PHY device being capable of recognizing an access command packet encapsulated in a standardized data packet, executing the access command packet, and generating an access acknowledgment packet in response to the access command packet, the access command packet containing an access command to access at least one of the registers of the extended PHY device.

12. The extended PHY device of claim 11, wherein the access command of the access command packet is a register read command for instructing the extended PHY device to read content stored in the at least one register of the PHY device, or is a register write command for instructing the extended PHY device to write certain data into the at least one register of the extended PHY device.

13. The extended PHY device of claim 12, wherein, when the access command of the access command packet is a register write command, the access command packet contains therein the certain data to be written into the at least one register of the extended PHY device.

14. The extended PHY device of claim 11, wherein the PHY device generates an access acknowledgment packet upon execution of the access command packet, the access acknowledgment packet acknowledging execution of the access command packet.

15. The extended PHY device of claim 14, wherein the access acknowledgment packet is a register read acknowledgment packet for acknowledging execution of a read operation on the at least one register of the extended PHY device, or is a register write acknowledgment packet for acknowledging execution of a write operation on the at least one register of the extended PHY device.

16. The extended PHY device of claim 15, wherein, when the access acknowledgment packet is a register read packet, the register read packet contains contents read from the at least one designated register of the PHY device.

17. The system of claim 15, wherein at least one of the access command packet and the access acknowledgment data packet is in a standardized data packet format.

18. A computer program product embodied in computer readable media as an extended protocol layer of a network system, for accessing at least one designated register of a Physical (PHY) device of the network system, the computer program product comprising computer executable instructions for:

generating an access command packet, the access command packet being encapsulated in a standardized Ethernet data packet and including an access command to access the at least one designated register of the extended Physical (PHY) device;

transmitting the generated access command packet to another computer program product that controls a Media Access Controller (MAC) device, so that the at least one designated register of the extended PHY device can be accessed.

19. The computer program product of claim 18, wherein the access command is a register read command for instructing the extended PHY device to read content stored in the at least one designated register of the PHY device, or is a register write command for instructing the extended PHY device to write certain data into the at least one designated register of the extended PHY device.

20. The computer program product of claim 19, wherein, when the access command is a register write command, the access command packet contains the certain data to be written into the at least one designated register of the extended PHY device.

21. The computer program product of claim 18, further comprising computer executable instructions for:

receiving an access acknowledgment packet from the extended PHY device, the access acknowledgment packet acknowledging execution of the access command;

and processing the access acknowledgment packet.

22. The computer program product of claim 21, wherein the access acknowledgment packet is a register read acknowledgment packet for acknowledging execution of a read operation on the at least one designated register of the extended PHY device, or is a register write acknowledgment packet for acknowledging execution of a write operation on the at least one designated register of the extended PHY device.

23. The computer program product of claim 22, wherein at least one of the access command packet and the access acknowledgment packet is in a standardized data packet format.

* * * * *